3,248,397
PROCESS FOR BODYING OXAZOLINE DRYING OILS AND PRODUCT THEREOF
Robert F. Purcell, Terre Haute, Ind., assignor to Commercial Solvents Corporation, a corporation of Maryland
No Drawing. Filed Dec. 4, 1964, Ser. No. 416,115
20 Claims. (Cl. 260—307)

The present application is a continuation-in-part of applications Serial Nos. 151,145, filed November 9, 1961, now abandoned, and 197,919, filed May 28, 1962.

The present invention relates to improved drying oils, and more particularly relates to improved drying oils and to a process for their production.

U.S. Patent No. 2,559,440, to Jordan et al., shows a process for producing drying oils by the reaction of an aminohydroxy compound, an organic carboxylic acid, and an aldehyde at temperatures above 150° C. The structure hypothesized in the patent for such compounds has, since the issuance of the patent been proved incorrect. It is now known that such drying oils are oxazolines which have the following general formula:

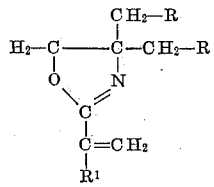

wherein R is the radical:

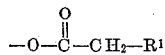

hydrogen, lower alkyl, or hydroxyl; and $R^1$ is hydrogen, alkyl or alkenyl, especially an alkyl or alkenyl having from 1 to about 25 carbon atoms.

Coating materials using drying oils having the above structure have been shown to possess many superior and desirable qualities such as resistance to water and alkalies, hardness, durability on exposure, and the ability to dry rapidly. However, the usage of such drying oils has been limited chiefly due to the inability to obtain proper viscosity or "body" for the drying oil without adversely affecting its color characteristics. Previously, in order to obtain proper body for such drying oils, the oil has been subjected to temperatures in the range of 250-300° C. for extended periods of time. Such high temperatures have not only adversely affected the color of the drying oil but made it difficult to properly control its final viscosity often resulting in the production of an unmanageable gel.

A process has now been discovered, however, whereby drying oils consisting essentially of a monomer having the formula:

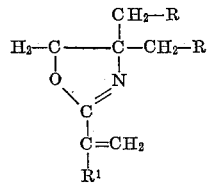

wherein R is the radical:

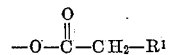

hydrogen, lower alkyl, or hydroxyl; and $R^1$ is hydrogen, alkyl or alkenyl having from 1 to about 25 carbon atoms, can be bodied and otherwise modified without adversely affecting the color of the final product, while at the same time improving other properties of the oil, e.g. drying characteristics, chemical resistance and durability on exposure. Thus this new process not only produces a product with improved body and drying characteristics but produces a vehicle for use in coatings which has high resistance to solvents and weathering.

The process for producing new products generally consists of incorporating into the above described drying oil a free-radical polymerization catalyst, e.g. peroxide catalyst, in amounts sufficient to polymerize the drying oil monomers and heating the thus formed mixture to obtain the desired viscosity by polymerization at the vinyl group. The polymerization can be a homopolymerization, or, if desired, the drying oils may be modified by reacting, e.g. copolymerizing, them with a dissimilar ethylenic unsaturated monomer having a terminal

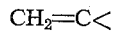

group in amounts necessary to give the desired modification.

A particularly preferred class of ethylenic unsaturated monomers are those having one ethylenic unsaturation such as the olefins, e.g. ethylene, propylene, isobutylene; acrylyl and alkacrylyl compounds, e.g., acrylic, haloacrylic, and methacrylic acids, esters, nitriles, and amides—for example, acrylonitrile, methyl methacrylate, ethyl methacrylate, butyl methacrylate, octyl methacrylate, cyclohexyl methacrylate, methoxymethyl methacrylate, n-butoxyethyl methacrylate, n-butoxyethoxyethyl methacrylate, aminoalkyl methacrylates such as beta-diethylaminoethyl methacrylate, chloroethyl methacrylate, methacrylic acid, ethyl acrylate, and alpha-chloroacrylic acid; vinyl and vinylidene halides, e.g. vinyl chloride, vinyl fluoride, vinylidene chloride, vinylidene fluoride, vinyl carboxylates, e.g. vinyl acetate, vinyl trimethylacetate, vinyl hexanoate, vinyl laurate, vinyl chloroacetate, vinyl propionate, and vinyl stearate; N-vinyl imides, e.g. N-vinyl-phthalimide and N-vinyl succinimide, N-vinyllactams, e.g. N-vinyl-caprolactam and N-vinylbutyrolactam, vinyl aryls, e.g. styrene, methyl styrene and vinylnaphthalene, and other vinyl derivatives such as methyl vinyl ketone, vinylpyridine, vinyl isobutyl ether, and vinyl ethyl ether.

In carrying out the instant process, the temperature employed can vary depending upon the particular catalyst and the particular monomers used. It has been found that the improved products can be suitably prepared at temperatures generally ranging from about 20° to about 200° or 220° C. In order to obtain optimum results, however, it is desirable when homopolymerizing the monomer to utilize a temperature of not less than 150° C., and when copolymerizing the drying oil monomer it is preferable to utilize temperatures ranging from about 60° or 100° to about 160° or 210° C. The amount of ethylenic unsaturated monomer, desirable for use in the instant process will naturally vary depending upon the particular drying oil monomer, the particular ethylenic unsaturated monomer, and the degree of modification desired. Generally, amounts of ethylenic unsaturated monomers ranging from about 5 to about 50 or 100 percent by weight based on the weight of the untreated drying oil can be satisfactorily employed to prepare the improved drying oils. However, for most purposes, it is usually preferred to use amounts of ethylenic unsaturated monomers ranging from about 15 to about 25 or 35 percent by weight based on the weight of the untreated drying oil.

In carrying out the process, in order to obtain proper reaction of the drying oil monomer, it is preferable to utilize catalyzing amounts of a catalyst. Suitable catalysts include the peroxide catalysts such as ditertiary butyl peroxide, cumene peroxide, benzoyl peroxide, etc., and the like. The amount of catalyst which can be satisfactorily utilized in the process will naturally vary depending upon the particular drying oil monomer and the degree of modification desired but generally ranges from about 0.1 to about 10 percent by weight based on the weight of the drying oil monomer. For optimum results with homopolymerization it is generally preferred to use from about 0.5 to about 6.0% based on the weight of the drying oil monomer, for copolymerization, from about 1 to 10% by weight can be used but it is generally preferable to use from about 1 to 3 to about 7 percent by weight, based on the weight of the ethylenic unsaturated monomer.

The length of time necessary to heat the drying oil monomer in the presence of a catalyst will also vary depending upon the particular monomer, amounts of catalyst utilized, the degree of modification desired, and whether homopolymerization or copolymerization is desired. Generally, however, periods ranging from about one to about three hours produce the desired results, for instance, at temperatures between 150° to 200° C.

The drying oil monomers referred to above include, for example, drying oil monomers prepared by reacting aminohydroxy compounds such as tris(hydroxymethyl) aminomethane, 2 - amino - 2 - methyl-1,3-propanediol, 2-amino-2-ethyl-1,3-propanediol, 2-amino-2-methyl-1-propanol, etc. with carboxylic acids such as acetic acid; propionic acid; pelargonic acid; saturated fatty acids such as caprylic acid, lauric acid, stearic acid, and lignoceric acid; unsaturated fatty acids such as oleic acid, linoleic acid, cetoleic acid, mixtures of fatty acids such as mixtures of $C_{18}$ unsaturated fatty acids, linseed fatty acids, fish oil fatty acids, tall oil fatty acids, etc., and thereafter with formaldehyde including paraformaldehyde and formaldehyde-releasing substances such as paraldehyde, aldol, furfural, etc. In the reaction, different acids can be used to close the oxazoline ring and to react at the hydroxyl substituents whereby in the above-described general formula the radicals identified as $R^1$ may be the same or different.

The following examples are offered to illustrate the present invention; however, the invention is not limited to the particular proportions, bodying agents, drying oils, etc., which are shown therein. Rather it is intended to include equivalents within the scope of my invention evident to those skilled in the art.

EXAMPLE I

To a closed reaction vessel equipped with an agitator and containing 1,180 pounds of tall oil fatty acids were added 162 pounds of tris(hydroxymethyl)aminomethane. The resulting mixture was blanketed with nitrogen and heated to 230° F. until an acid number of 10 was obtained. The reaction mixture was then cooled to 120° C. and to the cooled mixture were added 46 pounds of paraformaldehyde. The resulting mixture was then heated to 190° C. and held at that temperature until an acid number of 10 was again obtained. The material was then cooled to obtain the drying oil.

EXAMPLE II

From the material produced in Example I was obtained a 1,500-gram portion of drying oil having a color of Gardner 10 and an initial viscosity of Gardner I-J. The 1,500-gram portion was charged to a closed reaction vessel containing 1,012.5 grams xylene, 75 grams styrene, and 7.5 grams of ditertiary butyl peroxide. The contents of the vessel were heated to 135–140° C. and held at that temperature until the temperature stabilized. After stabilization of the temperature, a mixture containing 300 grams of styrene and 14 grams of ditertiary butyl peroxide was added by means of a dropping funnel to the reaction vessel over a period of one hour while maintaining the temperature at between 135–140° C. At the end of the one-hour addition period the contents of the vessel were heated to about 147–150° C. to reflux xylene and the reflux was continued for three hours to give a material containing 65 percent solids in the xylene having a color of Gardner 7 and a body of Gardner H. A mixture of the untreated oil of Example I and xylene was prepared to give a material containing 65 percent solids in xylene. The material had a viscosity of less than Gardner A. This comparison readily demonstrates the ability of styrene to improve the body of the thus treated oil.

EXAMPLE III

To a closed reaction vessel equipped with an agitator and containing 1,260 grams of linseed oil fatty acids were added 182 grams tris(hydroxymethyl)aminomethane. The resulting mixture was blanketed with nitrogen and heated to 230° F. until an acid number of 10 was obtained. The reaction mixture was then cooled to 120° C. and to the cooled mixture were added 45 grams of paraformaldehyde. The resulting mixture was then heated to 190° C. and held at that temperature until an acid number of 10 was obtained. The material was then cooled to obtain the drying oil which had a color of Gardner 7 and a body of Gardner C.

EXAMPLE IV

From the material produced in Example III was obtained a 500-gram portion of drying oil. The 500-gram portion was charged to a closed reaction vessel containing 275 grams of xylene, 30 grams of styrene, and 3 grams of ditertiary butyl peroxide. The contents of the vessel were heated to 135–140° C. and held at that temperature until the temperature stabilized. After stabilization of the temperature, a mixture containing 135 grams styrene and 7 grams ditertiary butyl peroxide was added by means of a dropping funnel to the reaction vessel over a period of one hour while maintaining the temperature at between 135–140° C. At the end of the one-hour addition period, the contents of the vessel were heated to about 147–150° C. to reflux xylene and the reflux was continued for a period of five hours to give a material containing 70 percent solids in the xylene having a color of Gardner 6 and a body of Gardner R.

EXAMPLE V

To a closed reaction vessel equipped with an agitator and containing 1,056 grams of linseed oil fatty acids were added 154.5 grams of tris(hydroxymethyl)aminomethane. The resulting mixture was blanketed with nitrogen and heated to 160° C. for 30 minutes. To the reaction mixture were then added 154.5 grams of tris(hydroxymethyl) aminomethane and the temperature of the mixture was raised to 180° C. and held for two hours. At the end of the two-hour period 86 grams of isophthalic acid were added to the reaction mixture and the temperature was raised to 200° C. After raising the temperature to 200° C. an additional 86 grams of isophthalic acid were added and the temperature was raised to 215° C. After raising the temperature to 215° C. an additional 86 grams of isophthalic acid were added to the reaction mixture and the temperature was raised to 230° C. and held at that temperature to obtain an acid number of 10. The resulting mixture was then cooled to 120° C. and to the cooled mixture were added 87.7 grams of paraformaldehyde. The resulting mixture was then heated to 190° C. and held until an acid number of 10 was obtained. The material was then cooled to obtain the drying oil.

EXAMPLE VI

From the material produced in Example V was obtained a 750-gram portion of drying oil. The 750-gram portion was charged to a closed reaction vessel containing 450 grams of xylene, 15 grams of styrene, and 1 gram of ditertiary butyl peroxide. The contents of the vessel were then slowly heated to 135–140° C. and held at that temperature until the temperature stabilized. After stabilization of the temperature, a mixture containing 95 grams of xylene, 60 grams of styrene, and 3.5 grams of ditertiary butyl peroxide was slowly added by means of a dropping funnel to the reaction vessel over a period of one hour while maintaining the temperature at between 135°–140°

C. At the end of the one-hour addition period the contents of the vessel were heated to about 147°–150° C. to reflux xylene and the reflux was continued for two hours to give a material containing 60 percent solids in the xylene having a color of Gardner 11–12 and a body of Gardner R.

EXAMPLE VII

From the material produced in Example I was obtained a 500-gram portion of drying oil. The 500-gram portion was charged to a closed reaction vessel containing 260 grams of xylene, 2 grams of ditertiary butyl peroxide, and 25 grams of styrene and heated to 135°–140° C. and held at that temperature until the temperature stabilized. After stabilization of the temperature a mixture containing 63 grams of methylmethacrylate monomer, 38 grams styrene, and 5.5 grams ditertiary butyl peroxide was added by means of a dropping funnel to the reaction vessel over a period of 2½ hours while maintaining the temperature at between 135°–140° C. At the end of the 2½ hour-addition period, the contents of the vessel were heated to about 147–150° C. to reflux xylene and the reflux was continued for three hours to give a material containing 71 percent solids in the xylene having a color of Gardner 7–8 and a body of Gardner R.

EXAMPLE VIII

A 175-gram portion of the drying oil prepared in Example II, a 175-gram portion of the drying oil prepared in Example IV, a 175-gram portion of the drying oil prepared in Example VII were incorporated into separate batches of a coating composition having the following formula:

| | |
|---|---|
| Titanium dioxide, grams | 125 |
| Phthalocyanine blue, grams | 3 |
| Methylethylketoxime, milliliters | 1.6 |
| 24 percent lead naphthanate, milliliters | 3.2 |
| 6 percent cobalt naphthanate, milliliters | 1.6 |

Sufficient mineral spirits to obtain a viscosity of 75 KU. Each of the coatings was then applied to a separate glass plate and allowed to dry at room temperature. The following table shows the time period required for each coating to "set" and to become hard.

*Table I*

| Drying oil used in coating | Time in hours to set | Time in hours to hardness |
|---|---|---|
| Example II | 4 | 9 |
| Example IV | 1½ | 8½ |
| Example VI | 1 | 3½ |
| Example VII | 5½ | 22 |

After drying 24 hours, each of the plates was first given 50 vigorous rubs with a cloth saturated with xylene and 50 vigorous rubs with a cloth saturated with mineral spirits. After rubbing no change was observed in the coated plate.

EXAMPLE IX

A drying oil was prepared following the procedure of Example II with the exception that ethylacrylate was utilized as the bodying agent instead of styrene and mineral spirits was utilized as the solvent instead of xylene. A drying oil having properties similar to the oil of Example II was produced.

EXAMPLE X

A drying oil was prepared following the procedure of Example II with the exception that vinylacetate was utilized as the bodying agent instead of styrene. A drying oil having properties similar to the oil of Example II was produced.

EXAMPLE XI

A drying oil was prepared following the procedure of Example II with the exception that vinyltoluene was utilized as the bodying agent instead of styrene. A drying oil having properties similar to the oil of Example II was produced.

EXAMPLE XII

A drying oil was prepared following the procedure of Example II with the exception that acrylonitrile was utilized as the bodying agent instead of styrene. A drying oil having properties similar to the oil of Example II was produced.

EXAMPLE XIII

Drying oils having properties similar to the oil in Example II are produced by the process of Example II substituting for the styrene one of the following: ethylene, propylene, methyl methacrylate, methoxymethyl methacrylate, chloroethyl methacrylate, vinyl chloride, vinylidene chloride, vinyl stearate, N-vinyl-phthalimide and N-vinylcaprolactam.

EXAMPLE XIV

Drying oils having properties similar to the oil in Example II are produced by the process of Example II substituting for ditertiary butyl peroxide one of cumene hydroperoxide and benzoyl peroxide.

EXAMPLE XV

To a closed reaction vessel equipped with an agitator and containing 1,180 pounds of tall oil fatty acids were added 162 pounds of tris(hydroxymethyl)aminomethane. The resulting mixture was blanketed with nitrogen and heated to 230° F. until an acid number of ten was obtained. The reaction mixture was then cooled to 120° C. and to the cooled mixture were added 46 pounds of paraformaldehyde. The resulting mixture was then heated to 190° C. and held at that temperature until an acid number of ten was obtained. The material was then cooled to obtain the drying oil.

The effect of peroxide catalyst treatment in the manufacture of improved resins is illustrated by the following example.

EXAMPLE XVI

From the material produced in Example I were obtained nine 1,000-gram portions of drying oils each having a color of Gardner 12 and an initial viscosity of I–J. To seven of the portions were added a peroxide catalyst. Two of the portions were untreated. The first seven portions of drying oil treated with peroxide were heated at 180° C. for periods ranging from one and one-half to two and one-half hours. The untreated portions were heated to between 250–300° C. for periods ranging from two to five hours. The results of these treatments are shown in the following table.

*Table II*

| Batch No. | Time held at indicated temp. in hours | Percent Catalyst | Final Viscosity (Gardner) | Final Color (Gardner) |
|---|---|---|---|---|
| 1 | 2 | None | Gel | Black (off of Gardner Scale). |
| 2 | 5 | do | 24–25 | Do. |
| 3 | 1½ | Ditertiary butyl peroxide 1% | U | 13. |
| 4 | 2½ | Ditertiary butyl peroxide 0.5% | P | 13. |
| 5 | 2½ | Ditertiary butyl peroxide 2% | Y–Z | 13. |
| 6 | 1½ | Ditertiary butyl peroxide 3% | 25–26 | 13. |
| 7 | 2 | Cumene hydro Peroxide 1% | O | 13. |
| 8 | 2 | Cumene hydro Peroxide 3% | U | 13. |
| 9 | 2 | Benzoyl Peroxide 3% | U | 13. |

The effect of the peroxide catalyst treatment on drying times of drying oils is illustrated by the following example.

EXAMPLE XVII

A 175-gram portion of the peroxide treated drying oil of Batch 5 of Table II, a 175-gram portion of the peroxide treated drying oil of Batch 6 of Table II, and a 175-gram portion of a drying oil consisting of 150 grams of untreated oil produced in Example XV and 25 grams of maleic resin were incorporated into separate batches of a coating composition having the following formula:

| | |
|---|---|
| Titanium dioxide, grams | 125 |
| Phthalocyanine blue, grams | 3 |
| Methylethylketoxime, milliliters | 1.6 |
| 24% lead naphthanate, milliliters | 3.2 |
| 6% cobalt naphthanate, milliliters | 1.6 |

Sufficient mineral spirits to obtain a viscosity of 75 K.U.

Each of the coatings was then applied to a separate glass plate and allowed to dry at room temperature. The following table shows the time period required for each coating to "set" and become hard.

*Table III*

| Drying oil used in coating | Time in hours to set | Time in hours to hardness |
|---|---|---|
| Batch 5 | 10 | 13 |
| Batch 6 | 5½ | 8 |
| Untreated oil | 33 | 48 |

EXAMPLE XVIII

A bodied drying oil was prepared by charging 3 mols (840 grams) stearic acid and 1 mol (121.1 grams) tris(hydroxymethyl)aminomethane in a 2-liter resin flask equipped with an agitator, thermometer, and inert gas sparge. The material was heated to 230° C. and held until the acid number reached 7.5. This was accomplished in about 4 hours. The batch was then cooled to 120° C. 1 mol, plus a slight excess (35 grams), of paraformaldehyde were then added to the batch and the temperature increased to 190° C. One mol of water was released and the batch was heated at 190° C. for approximately 5 hours. The acid number at this time was 9.5.

Infrared spectra of the material following addition of paraformaldehyde contain a band at approximately 1600 cm.—which represents the vinyl group

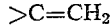
$$>C=CH_2$$

This is not present on spectra of the material before the formaldehyde condensation, and has disappeared in spectra of the material following the polymerization with peroxide. Average molecular weight figures for the three reaction materials are prior to addition of paraformaldehyde, 1,357; after addition of paraformaldehyde, 1,518; and after heating with ditertiary butyl peroxide, 5,173; again indicating polymerization. Since no unsaturation subject to polymerization is present in the fatty acid this increase must have come through polymerization of the vinyl group.

EXAMPLE XIX

A drying oil produced by the reaction of Example XV from tall oil fatty acids, 2-amino-2-methyl-1,3-propanediol and paraformaldehyde is bodied by the process of Example XVI.

EXAMPLE XX

A drying oil produced by the reaction of Example XV from tall oil fatty acid, 2-amino-2-methyl-1,3-propanediol and paraformaldehyde is bodied by the process of Example VI.

EXAMPLE XXI

A drying oil produced by reacting one mol of acetic acid with one mol of tris(hydroxymethyl)aminomethane to produce an oxazoline and thereafter reacting the oxazoline with two mols of stearic acid is bodied by the process of Example VI.

EXAMPLE XXII

A drying oil produced by reacting two mols of stearic acid with one mol of tris(hydroxymethyl)aminomethane and thereafter with one mol of formaldehyde is bodied by the process of Example XVI.

EXAMPLE XXIII

A drying oil was prepared by charging 434 grams (2.679 mols) Pelargonic Acid and 108.1 grams (0.893 mol) Tris Amino® to a 1-liter flask fitted with an agitator, thermometer and gas sparge tube. The flask was heated to 200° C. and held for 5.5 hours until an acid number of 9.5 had been reached. The material was cooled to 120° C. and 32 grams (.9 mol plus small excess of paraformaldehyde) was added to the reaction mixture which was then heated to 190° C. and held for 5 hours until the water (.89 mol) had been removed and the acid number was again 9.5. Viscosity of the material produced was B (Gardner tube).

A first 75-gram sample of this material, and 1.5 grams of ditertbutyl peroxide were placed in a 500 milliliter flask equipped with an agitator, thermometer, gas sparge, and reflux condenser and heated to 180° C. The material was held at this temperature for 2 hours. Viscosity of the material after this time had increased to K (Gardner tube).

A second and similar sample of the material was treated in the same manner except 3 grams ditertbutyl peroxide was used. Viscosity of the material in this case increased from B to R–S (Gardner tube). Since no other unsaturation subject to polymeriaztion during heating with the peroxide catalyst is present, the viscosity increase must be due to polymerization of the vinyl group introduced by the formaldehyde condensation.

It is claimed:

1. A process for the preparation of drying oils having improved viscosity which comprises treating a compound having the formula:

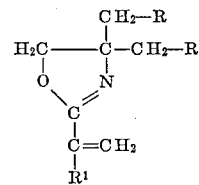

wherein R is selected from the group consisting of the radical:

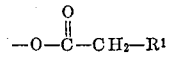

lower alkyl, hydroxyl and hydrogen, and $R^1$ is selected from the group consisting of hydrogen, alkyl and alkenyl with a peroxide catalyst and heating the treated compound to a temperature of from 20° to 220° C.

2. The process of claim 1 wherein said temperature is not less than 150° C.

3. In a process for the bodying of drying oils having the formula:

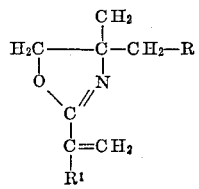

wherein R is selected from the group consisting of the radical:

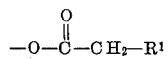

lower alkyl, hydroxyl and hydrogen and $R^1$ is selected from the group consisting of hydrogen, alkyl and alkenyl without adversely affecting the color of the drying oil, the improvement which comprises treating the drying oils with from about 0.1 to about 10% of a peroxide catalyst and heating the treated drying oil at a temperature ranging from about 150°–220° C. for a period of from about one to about three hours.

4. The process of claim 3 wherein the peroxide catalyst is ditertiary butyl peroxide.

5. The process of claim 3 wherein the peroxide catalyst is cumene hydroperoxide.

6. The process of claim 3 wherein the peroxide catalyst is benzoyl peroxide.

7. The process of claim 3 wherein the amount of peroxide catalyst ranges from about 0.5 to about 6% by weight of the drying oil.

8. A process for the preparation of drying oils comprising reacting a compound having the formula:

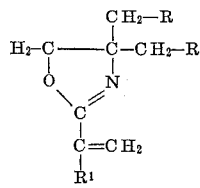

wherein R is selected from the group consisting of the radical:

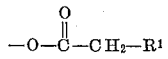

lower alkyl, hydrogen, and hydroxyl; and $R^1$ is selected from the group consisting of alkyl, alkenyl and hydrogen with a dissimilar ethylenic unsaturated monomer having one ethylenic unsaturation and having a terminal

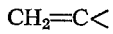

in the presence of a peroxide catalyst at temperature ranges from about 20 to about 220° C.

9. The process of claim 8 wherein the temperature ranges from about 100 to about 160° C.

10. A process for preparing drying oils comprising reacting a compound having the formula:

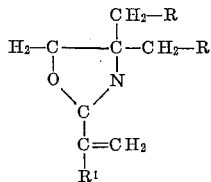

wherein R is selected from the group consisting of the radical:

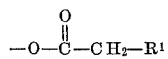

lower alkyl, hydrogen, and hydroxyl and wherein $R^1$ is selected from the group consisting of hydrogen, alkyl and alkenyl with from about 5 to about 50 percent by weight based on the weight of said compound, of a dissimilar ethylenic unsaturated monomer having one ethylenic unsaturation and having a terminal

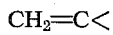

in the presence of from about 1 to about 10 percent by weight based on the weight of the ethylenic unsaturated monomer of a peroxide catalyst, the reaction being carried out at temperatures ranging from about 20 to about 220° C.

11. The process of claim 10 wherein the ethylenic unsaturated monomer is present in amounts ranging from about 15 to about 25 percent by weight based on the weight of the compound and the peroxide catalyst is present in amounts ranging from about 3 to about 7 percent by weight based on the weight of the ethylenic unsaturated polymer.

12. The process of claim 10 wherein the ethylenic unsaturated monomer is an olefin.

13. The process of claim 10 wherein the ethylenic unsaturated monomer is selected from the group consisting of acrylyl and alkacrylyl compounds.

14. The process of claim 10 wherein the ethylenic unsaturated monomer is a vinyl halide.

15. The process of claim 10 wherein the ethylenic unsaturated monomer is a vinylidene halide.

16. The process of claim 10 wherein the ethylenic unsaturated monomer is a vinyl carboxylate.

17. The process of claim 10 wherein the ethylenic unsaturated monomer is an N-vinylimide.

18. The process of claim 10 wherein the ethylenic unsaturated monomer is a N-vinyllactam.

19. The process of claim 10 wherein the ethylenic unsaturated monomer is a vinylaryl compound.

20. Drying oils having improved body and drying characteristics and with high resistance to solvents and weathering prepared by reacting a drying oil having the formula:

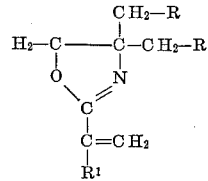

wherein R is selected from the group consisting of the radical:

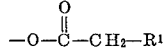

lower alkyl, hydrogen, and hydroxyl, and wherein $R^1$ is selected from the group consisting of hydrogen, alkyl and alkenyl with from about 5 to about 50 percent by weight based on the weight of the drying oil of a dissimilar ethylenic unsaturated monomer having one ethylenic unsaturation and having a terminal

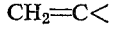

at temperatures ranging from about 20 to about 220° C. in the presence of from about 1 to about 10 percent by weight based on the weight of the ethylenic unsaturated monomer of a peroxide catalyst.

References Cited by the Examiner

UNITED STATES PATENTS 2,559,440   7/1951   Jordan et al. _____ 260—404.5

OTHER REFERENCES

Shapiro, Am. Paint. Journal, vol. 40, No. 46, pages 70, 72–73, 76 and 78.

NICHOLAS S. RIZZO, *Primary Examiner.*